United States Patent
Thomas

(10) Patent No.: US 6,886,484 B2
(45) Date of Patent: May 3, 2005

(54) COMPOSITE TENSION ROD TERMINAL SYSTEMS

(76) Inventor: Georg K. Thomas, 461 Mill Springs La., Plantation, FL (US) 33325

( * ) Notice: Subject to any disclaimer, the term of this patent is extended or adjusted under 35 U.S.C. 154(b) by 0 days.

(21) Appl. No.: 10/366,043

(22) Filed: Feb. 12, 2003

(65) Prior Publication Data

US 2004/0156672 A1 Aug. 12, 2004

(51) Int. Cl.$^7$ ................................................. B63H 9/04
(52) U.S. Cl. ........................ 114/108; 403/268; 403/334
(58) Field of Search ................................. 114/108, 105, 114/112; 403/268, 269, 333, 334, 361, 41; 365/174, 189.01, 185.01, 185.23, 226, 230.06

(56) References Cited

U.S. PATENT DOCUMENTS

| | | | |
|---|---|---|---|
| 902,673 A | | 11/1908 | Moench ...................... 403/184 |
| 1,849,067 A | | 3/1932 | Bridges ........................ 403/334 |
| 1,849,069 A | | 3/1932 | Bridges ........................ 403/334 |
| 1,950,947 A | | 3/1934 | Mulroyan ............... 285/148.22 |
| 2,045,520 A | | 6/1936 | Davison ........................ 403/41 |
| 2,079,692 A | | 5/1937 | Lapointe ...................... 403/334 |
| 3,507,949 A | * | 4/1970 | Campbell ..................... 403/268 |
| 3,573,346 A | | 4/1971 | Appleby ..................... 174/71 R |
| 3,802,373 A | * | 4/1974 | Lagerquist ................... 114/105 |
| 3,851,609 A | * | 12/1974 | Stearn ........................ 114/105 |
| 3,958,523 A | * | 5/1976 | Holmes et al. .............. 114/105 |
| 4,023,886 A | | 5/1977 | Nakayama et al. ........... 385/80 |
| 4,127,741 A | | 11/1978 | Bauer et al. ................. 174/189 |
| 4,130,926 A | * | 12/1978 | Willem ........................ 403/268 |
| 4,653,953 A | * | 3/1987 | Anderson et al. ............ 403/268 |
| 4,679,960 A | | 7/1987 | Mizuhara ..................... 403/272 |
| 4,822,201 A | * | 4/1989 | Iwasaki et al. .............. 403/268 |
| 4,917,530 A | | 4/1990 | Engelhardt et al. .......... 403/334 |
| 5,297,077 A | * | 3/1994 | Imai et al. ................... 365/145 |
| 5,415,490 A | * | 5/1995 | Flory .......................... 403/268 |
| 5,463,970 A | * | 11/1995 | Hartlmeier et al. .......... 114/105 |
| 5,611,636 A | * | 3/1997 | Flory .......................... 403/269 |
| 5,629,888 A | * | 5/1997 | Saito et al. .................. 365/145 |
| 5,713,169 A | | 2/1998 | Meier et al. .............. 52/223.13 |
| 6,301,145 B1 | * | 10/2001 | Nishihara .................... 365/145 |
| 2003/0010966 A1 | | 1/2003 | Sjostedt ...................... 254/231 |

* cited by examiner

*Primary Examiner*—Lars A. Olson
(74) *Attorney, Agent, or Firm*—Pearne & Gordon LLP

(57) ABSTRACT

A composite tension rod is received in the sleeve portion of a shank that forms part of a terminal fitting, and is spaced from the shank sleeve and connected thereto by a potting resin. The shank sleeve wall tapers out from thin at its distal end to thick at the bury depth of the rod. The rod is tapered outwardly from a point of minimum diameter at its inner end to its full diameter a given distance from the end. The shank sleeve and rod have complementary dual tapering along said length such that as the diameter of the rod along said distance increases, the wall thickness of the shank sleeve decreases. The resin layer and the rod are secured to each other against relative longitudinal movement, as are the resin layer and the shank sleeve.

In another aspect of the invention, a tension rod sleeve is fixed to the tension rod and extends over the distal end of the shank sleeve and along all or a majority of the length of the shank sleeve. The rod sleeve is tapered so that its wall thickness decreases to a minimum in the vicinity of the proximal end of the shank sleeve, or the rod sleeve, as it extends along the shank sleeve, is divided, or divides, into two halves or bands which join to form loop extending around a loop-engaging, convex, fiber-turnaround face formed on the terminal fitting. Such face extends transversely from one side to the other of the fitting.

32 Claims, 5 Drawing Sheets

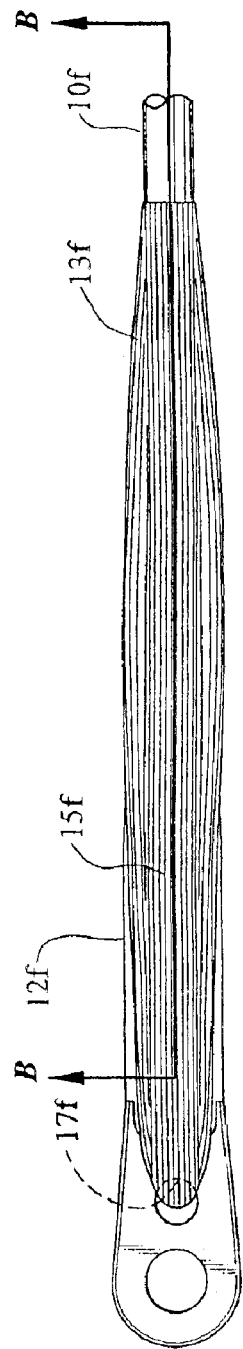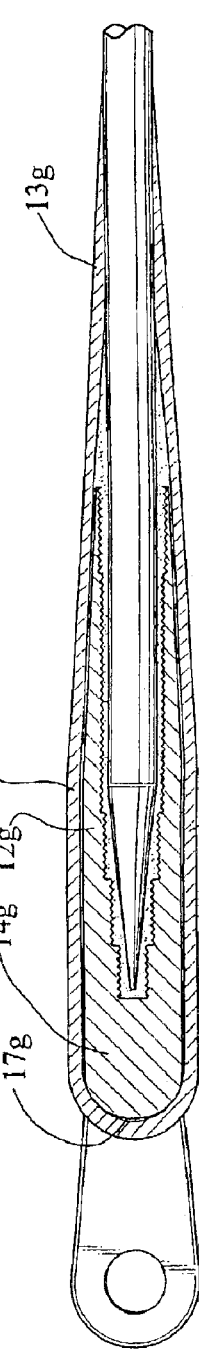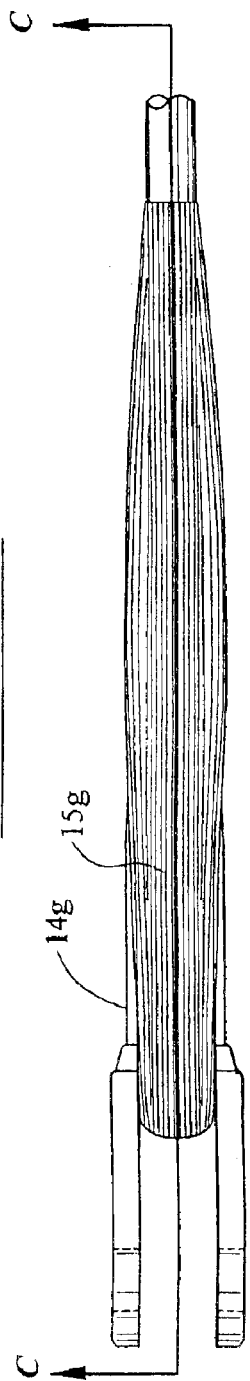
FIG. 2F-2　　FIG. 2G-1　　FIG. 2G-2

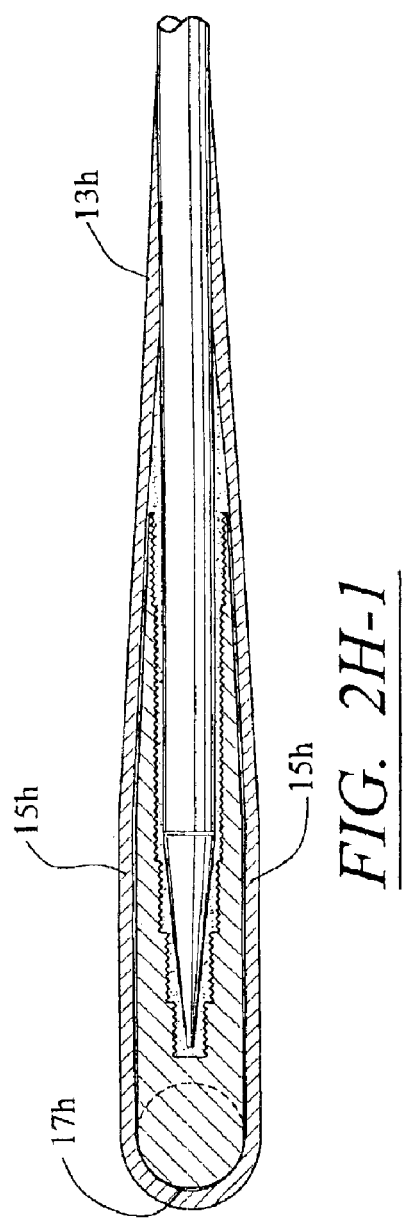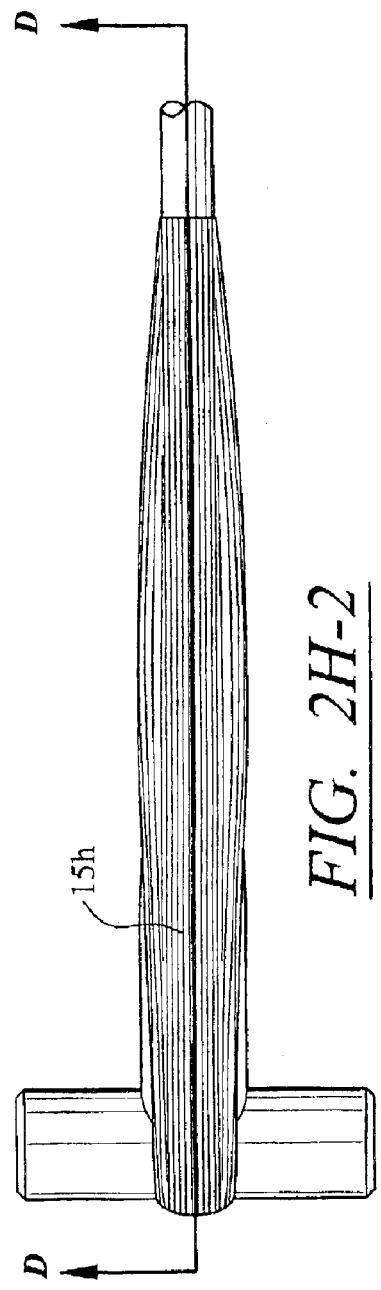
*FIG. 2H-1*
*FIG. 2H-2*

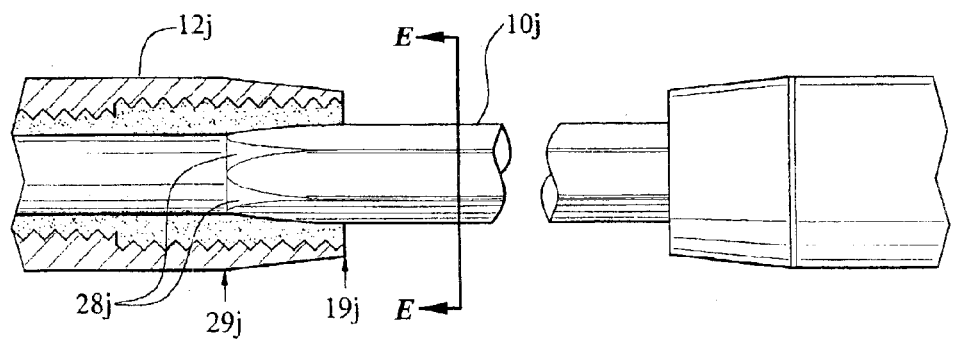
FIG. 2J
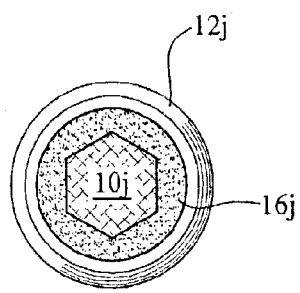
FIG. 2J-1
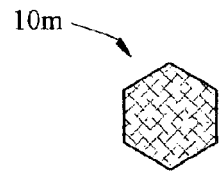
FIG. 2K-1
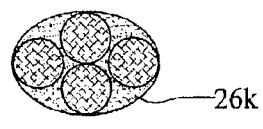
FIG. 2K-2
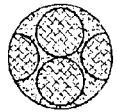
FIG. 2K-3
FIG. 2M-1
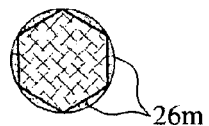
FIG. 2M-2

COMPOSITE TENSION ROD TERMINAL SYSTEMS

FIELD OF THE INVENTION

This invention relates to terminal systems for composite fiber-reinforced resin tension rods, or cables made up of multiple rods, generally formed by pultrusion, hereinafter collectively referred to as fiber-reinforced composite rods, fiber-reinforced rods, composite tension rods, or as composite rods, or tension rods, or simply rods, and comprising carbon-fiber-reinforced resins, or resins reinforced with other fibers, and having the properties of geometric slimness and high tensile strength per unit weight. "Other fibers" includes fibers such as Kevlar®, Spectra®, Zylon®, and Twaron® brands of fiber, and, in general, fibers or blends of fibers that provide high tensile strength per unit weight when combined with a polymer resin matrix.

Composite tension rods differ from ropes or lines made of strands of twisted fibers consisting of fiber materials that are the same or similar to the fiber materials just mentioned. Unlike ropes or lines made of strands of twisted fibers, composite tension rods are essentially creep-free, have good resistance to abrasion, and are dimensionally stable under handling or coiling.

A terminal system of a kind intended by the invention may be embodied at one or both ends of a tension rod, and if at both ends, in the same or in different specific forms. Terminal systems of the invention each include the rod itself at one of its ends, a terminal fitting that transfers tensile stresses carried by the rod, and a layer of potting resin between the rod and the fitting. "Terminal fitting" alludes to a terminal for a rod, not necessarily to termination on a deck, mast, cross-arm, rail, post, or other fixed element. The term therefore includes rod fittings designed to join rods to non-fixed elements such as other fittings at the ends of other rods, as well as including rod fittings designed to join rods to fixed elements such as masts, cross-arms, rails, posts, decks or the like.

BACKGROUND OF THE INVENTION

The terminal systems of the present invention are particularly appropriate in applications where not only is it important to minimize the weight of tension rods, but also it is important to minimize the weight and size of terminal fittings and related hardware by providing relatively light and geometrically slim terminal systems. An important application is sailing yachts, where rigging connects not only at the deck but aloft at many locations along the mast, either at the mast wall or at spreader tips (from which the rigging continues up at an angle and at smaller size), and where in general each rigging line or stay requires fittings at both ends, and many fittings are aloft. If heavy and bulky fittings are required for each end of each stay, cable or rod, the potential advantages of the composite tension rods are largely defeated. These constraints have discouraged widespread employment of composite tension rods in sailing yachts despite the potential for improvement in gross weight and in weight distribution, and the further advantages of freeness from creep, good resistance to abrasion, and dimensional stability under handling or coiling. Composite tension rods reinforced with carbon fibers or other of the fiber materials mentioned above are believed to have been pultruded as rods of circular cross-section and tried in performance applications as diagonals and verticals in yacht rigging, but so far as known, to date no commercially successful design of terminal system has been provided for such rods, and their use has languished.

Applications such as sailing yachts are to be contrasted with systems such as bridge roadway construction where tensioned bridge stays are continuous across the tops of the bridge tower, and require no anchoring fittings aloft, and are connected by anchoring members located at ground points at or near the roadway, where weight and bulkiness is of little or no concern. A known anchoring system for composite carbon-fiber reinforced bridge stays used in such an application is disclosed in U.S. Pat. No. 5,713,169. It includes an "anchor body" or frustum of potting resin that coaxially receives and is bonded to the bridge stay or composite tension member. The wall thickness of the cone of potting resin varies along the cone length, and is always greater than the composite tension member's radius. The cone wall thickness increases along the cone length in such a way as to preserve the strictly conical shape of the cone of resin, and reaches several times the tension member's radius at the back end of the cone of resin, that is, the end opposite to the point where the free length of the tension member enters the front end of the cone. The conical anchor body is slidably received in a steel casting or "anchor casing." A "slide film," in the form of a Teflon foil, or a deposit of a "separation agent", is included for this purpose. The internal surface of the anchor casing must also be strictly conical in shape for this purpose, and the interface between the anchor body and the anchor casing must be free of any adhesive bond or mechanical keying such as threaded engagement at the interface. The ability of the anchor body to slide relative to the anchor casing is necessary to allow for the proper wedging action of the cone and captured compression.

Systems have been proposed for terminating fiber-reinforced tension members used in sailing yachts, but such systems relate primarily to tension members consisting of a wrapped plurality of rods, rather than to monolithic rod pultrudates as in the present invention, and furthermore are subject to constraints similar to those of the bridge stay terminating systems just discussed. U.S. Patent Application Pub. No. 20030010966 shows one such system that, like the system of U.S. Pat. No. 5,713,169 cited above, relies on slippage (paragraph 0067) and on captured compression within a frustum (paragraphs 0053, 0068). The fittings of such systems must be designed to withstand high hoop loads in the fitting (paragraph 0074). Moreover, to a large extent such systems rely on the bundling together of multiple small relatively flexible composite rods. When such rods enter a bulky fitting, the transition from relatively flexible small composite rods to relatively stiff fitting happens in an abrupt manner. This means when the rigging is slack (low tension) the fitting and rods will bend relative to one another, and wear and fatigue at the entrance to the terminal fitting will result in premature failure. (This also happens in conventional wire rigging between the cable and a swaged fitting. At a typical sailboat deck the rigging turnbuckle is located between the deck chain plate and the swage, and when the rigging is not under load the turnbuckle is free to rock back and forth in motion with the boat. This motion and the weight of the turnbuckle apply a bending load to the cables that exit the swage fitting and slightly bend them back and forth. Small bundled rods as in the patent application publication would not only bend but would also wear against each other at this exit location.)

BRIEF DESCRIPTION OF THE INVENTION

The present invention overcomes the above-discussed constraints and disadvantages of prior-art terminal systems for composite tension members. The invention accomplishes termination or anchoring of a composite tension rod by a terminal system that is geometrically slim, relatively light, free of thick layering of potting resin, and free of the need to provide parts adapted to slide with respect to each other or to generate captured compression. The invention provides a system in which the potting resin is relatively thinly layered around the tension rod and is fixed to both the tension rod and to a surrounding shank sleeve that coaxially surrounds the tension rod and the layer of potting resin. The shank sleeve is formed by a bore extending from the end of the shank of a fitting and is filled with the resin and the tension rod. Tapering of the parts so as to vary their cross-sections along the bury length of the tension rod (the length that the rod extends into the bore beyond the entry point) operates to reduce elevation of load-transfer intensity values (in units of force per unit area, such as pounds per square inch) at regions near the ends of the bore locations above those of adjacent regions within the bore as compared to what such elevation would be in the absence of tapering, thereby contributing to uniformity of load transfer along the bore.

The invention also contemplates fittings that include a rod sleeve attached to the rod proper and extending along the exterior of the shank sleeve. The rod sleeve may be tapered to reduce elevation of load-transfer intensity values between it and the exterior of the shank sleeve, or may be formed to include tension-carrying bands.

These and related features, more fully described below, result in light and geometrically slim terminal arrangements which may be used at the ends of tension rods employed in the rigging of a yacht to provide a superior combination of strength and lightness in both tension rods and fittings at many or all points, high and low, throughout the rigging.

The invention is not restricted to use in sailing yachts or other sailing vessels, and may also be employed in other applications such as for example pultruded composite tension rods used along with circular isolator disks to electrically isolate power transmission lines from towers or other structures that carry them, or in still other applications where, although avoidance of bulkiness of the terminal fitting is of little or no importance, other attributes of the invention remain attractive. Such still other applications may include for example mooring lines for ships or floating platforms, or stays for land based structures.

BRIEF DESCRIPTION OF THE DRAWINGS

FIG. 1 includes a fitting and one end of a composite tension rod. The terminal system whose components are shown in FIG. 1 is neither known to be nor believed to be prior art.

FIG. 2A includes a fitting and one end of a composite tension rod.

FIG. 2C-1 is a fragmentary view showing an alternative to the structure shown in FIG. 2C.

Figure 2A:
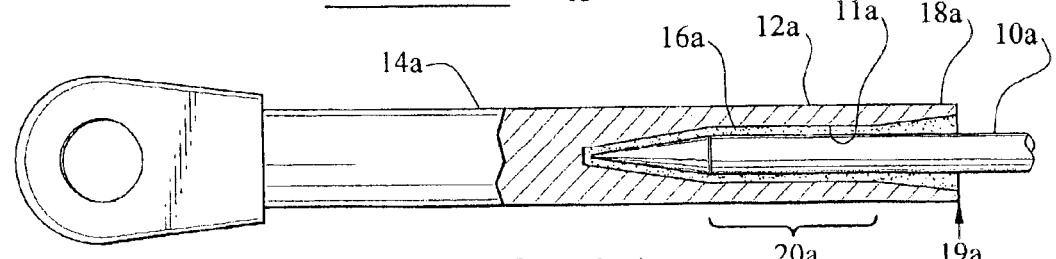
FIG. 2A is a partly broken-away view of components of a terminal system that does embody the present terminal system invention.
Figure 2B:
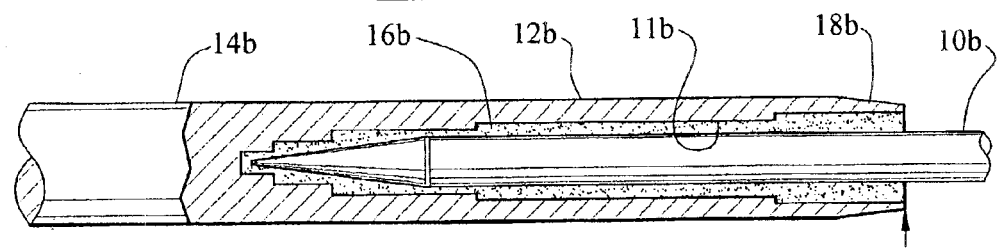
FIGS. 2B and 2C are partly broken-away views of components of other terminal systems that embody the present terminal system invention.
Figure 2C:
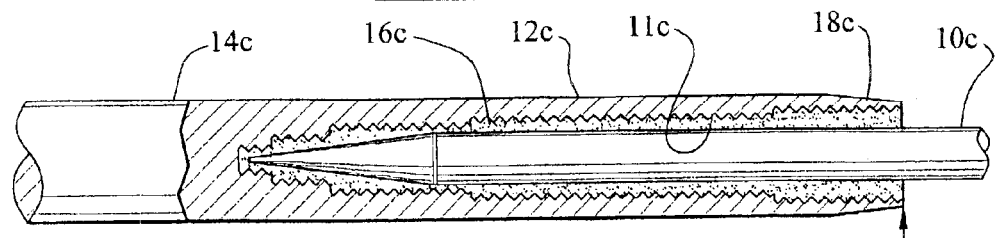
Figures 1, 2C:
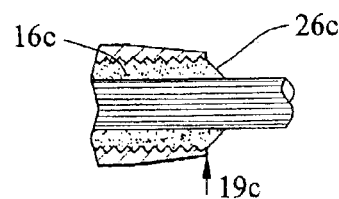
Figure 2D:
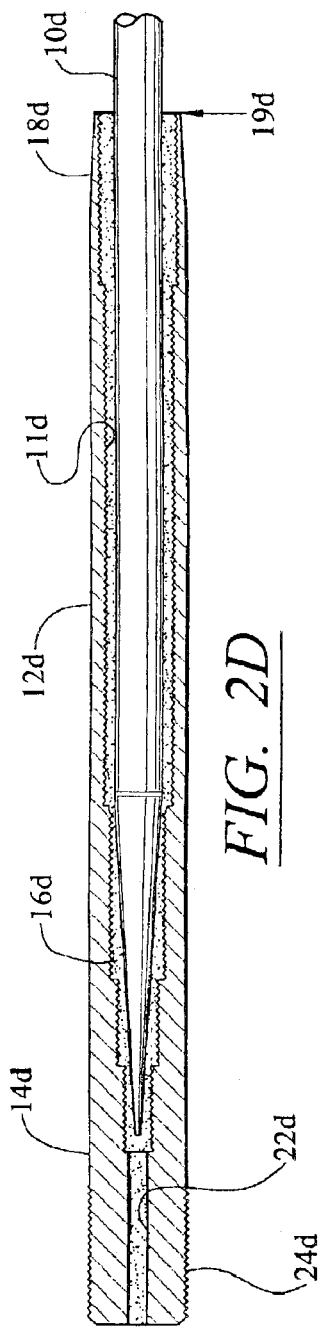
FIG. 2D is a cross-sectional view of still another terminal system that embodies the present terminal system invention.

As compared to the other drawings, FIG. 2D more accurately scales length and width dimensions to each other in order to better convey an idea of the degree of geometric slimness that the present invention can provide.

Figure 2E:
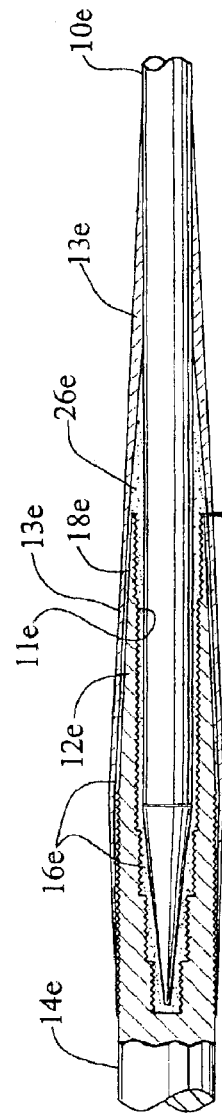

FIG. 2E is a partly broken away view of another terminal system that embodies the invention. This figure is not as accurately scaled as FIG. 2D, but is of the general style as most of the other drawings.

Figure 1:
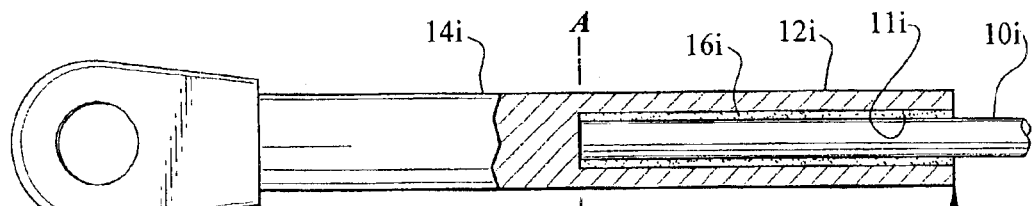
FIG. 1 is a partly broken-away view of components of an imaginary or hypothetical terminal system that is useful as an aid in describing the present terminal system invention, but that does not embody the present terminal system invention.
Figures 1, 2F:
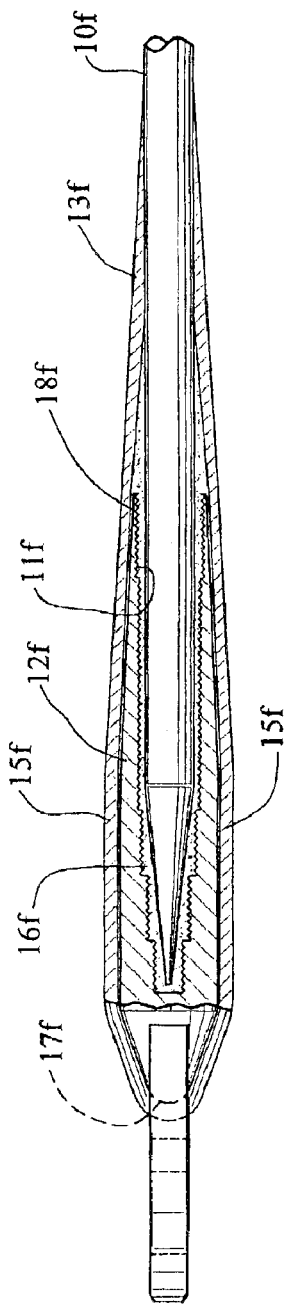

FIG. 2F-1 is a view taken on line B—B in FIG. 2F-2.

FIG. 2F-2 is a plan view of another terminal system embodying the invention.

FIG. 2G-1 is a view taken on line C—C in FIG. 2G-2

FIG. 2G-2 is a plan view of another terminal system embodying the invention.

FIG. 2H-1 is a view taken on line D—D in FIG. 2H-2.

FIG. 2H-2 is a plan view of another terminal system embodying the invention.

FIG. 2J is a view, partly in cross-section, of still another embodiment of the invention, drawn on a somewhat larger scale than are most of the drawings.

FIG. 2J-1 is a view taken on line E—E in FIG. 2J.

FIG. 2K-1 is a cross-section of another shape of rod that may be used in the practice of the invention, made up of two smaller rods.

FIGS. 2K-2 and 2K-3 are cross-sections illustrating steps in the building-up of an end portion of the rod seen in FIG. 2K-1.

FIG. 2M-1 is a cross-section of another rod that may be used in the practice of the invention.

FIG. 2M-2 is a cross-section illustration the building-up of an end portion of the rod seen in FIG. 2M-1.

DETAILED DESCRIPTION OF THE INVENTION

In order to best describe the terminal systems of the invention, it is convenient to first describe an imaginary or hypothetical terminal system. Imagine a terminal system at one end of a composite tension rod as seen in FIG. 1. The tension rod, labeled $10i$ in the drawing, is of conventional round (circular) cross-section, and is received in the bore $11i$ of a sleeve $12i$. The sleeve is formed as part of the shank $14i$ of a terminal fitting, in this case an eye. The eye may have a threaded bore (not shown) in which exterior threading (not shown) on the shank is received, the eye being turned down tightly on the shank to form a fitting, in this case the eye. The shank could join to parts other than an eye to form other common types of fittings, such as forks, stud terminals, or swivel bails, or join to tees, cross-pins or barrels that form part of toggle connections, or the shank could be somewhat elongated and threaded for a required adjusting distance to function as part of a turnbuckle connection.

Imagine further that the rod is bonded to the sleeve by potting resin $16i$, which is sandwiched between the rod and the sleeve and fills any parts of the bore not taken up by the inserted rod. The intended function of the system is for the tensile load carried by the rod to be transferred to and fully taken up by the shank $14i$, the load transfer occurring across the layer of potting resin and along the length of the bore $11i$ in which the rod is received.

Of course it is intended that the tensile loading of the rod will vary across a range of values. Tensile loading changes in response to the different loads imposed on the rod by many variables, for example by different wind, sea, and maneuvering conditions. The loading of the rod will not jump instantaneously from zero to a level at or near the full working load, but rather applied loads will rise, whether precipitously or relatively slowly or a mixture of both, through a continuum of load values from zero toward the working load—the maximum tensile load (expressed in units of force, such as pounds) for which the system is designed. The applied loads also return to or toward zero through the same continuum of values.

As the loading of the rod increases, the load is transferred through the resin layer and is taken up by the shank sleeve 12$i$ by elastic deformation of the latter. Elastic deformation of the sleeve should ideally take place along the entire length of the bore, but occurs at some points before others, or occurs to a greater degree at some points than at others, under most practical conditions.

The working load for the rod will need to be considerably under its breaking strength, to assure tolerance of cyclic fatigue loading, long-term fatigue loading, ultraviolet and weathering, impact wear, and chafe wear. While some higher end composite materials might allow selection of a working load of say about 150,000 to 180,000 psi, a typical reasonable working load selection for lower end composite materials may be say from 80,000 to 100,000 psi. Suppose a rod material is used for which one of these working loads is selected. Further, assume the load-transfer intensity capacity of the resin (expressed in units of force per unit area, such as psi) is such that it substantially exceeds the average load transfer intensity from the rod to the resin at working load. (Average load transfer intensity can be readily calculated as a function of working stress, buried length and rod radius. "Load-transfer intensity capacity of the resin" is intended as a shorthand reference to the highest intensity of load that the combined rod, resin layer, and sleeve have the capacity to transfer between the rod and the sleeve, and will be determined by the lowest of the following load-transfer intensity capacities: that of the resin itself, that of the resin/sleeve interface, and that of the resin/rod interface, for the specific rod, resin and sleeve materials.)

Further imagine that the fitting is made of stainless steel whose yield strength is such that the fitting requires a minimum of three times the cross-sectional area of the rod to keep the fitting stress below the yield strength of the steel, which is a realistic reflection of actual relationships and requirements in the field. That cross-sectional area would have to be provided at the plane A—A seen in FIG. 1 and, if the potting resin 16$i$ took up no thickness, would geometrically require that the diameter of the shank at that point be double that of the rod to keep the fitting stress below yield strength. The shank diameter requirement would actually be somewhat higher, taking into account that the potting resin does take up some thickness.

Suppose then that these reasonable selections and dimensional relationships are established. Even so, the imagined device of FIG. 1 will not operate satisfactorily under most practical circumstances. Instead the system will fail under full working load either immediately, or in relatively short time.

It is believed that failure under such circumstances is due to "load dumping," that is, local load-transfer intensity values rising above the load-transfer intensity capacity of the potting resin at the entry point region where the rod enters the shank, or at the end point region where the rod terminates or both, for the following reasons: With reference to the entry point region, since the wall thickness of the sleeve 12$i$ is at the same high value at the entry end of the bore as at other locations along the bore, the sleeve is no more stretchy (no less stiff) at the entry point 19$i$ than it is at other locations along the bore. The sleeve therefore strongly resists elastic deformation, causing local stress intensity to rise rapidly as the applied load increases. Nor is the situation relieved by the occurrence of sufficient elastic deformation at other locations on the sleeve, where the sleeve wall is equally thick. Elastic deformation at such other locations cannot occur in sufficient degree to prevent the local stress intensity at the entry end region from escalating beyond the load-transfer intensity capacity of the resin, so that local defects in resin bonding occur. Such local de-bonding can then propagate either immediately, or during fatiguing in the course of repeated cycles of loading and unloading, or after long-period loading, leading to overall failure.

Characteristic of such a load dumping situation is the relatively great elevation of load-transfer intensity values (in pounds per square inch or in other units of force per unit area) at the entry point region above load-transfer intensity values at deeper regions within the bore, including adjacent regions just a little further in than the region of the entry point.

With reference to the end point region of the rod, a similar situation applies, but here instead of the relatively stiff end of the sleeve furnishing strong resistance to elastic deformation, it is the relatively stiff end of the rod that does so. The rod diameter is at the same full value at the end point region of the rod as it is at other locations along the bore. The end point region of the rod therefore strongly resists elastic deformation, i.e. stretching, when responding to the stress imposed on it by the shank 14$i$ under applied loads, causing local stress intensity to rise as the applied load increases.

The situation is not relieved by the occurrence of sufficient elastic deformation at other locations on the rod, where the rod diameter is equally high. Elastic deformation at such other locations cannot occur in sufficient degree to prevent the local stress intensity at the end point region of the rod from escalating beyond the load-transfer intensity capacity of the resin, so that local failures in resin bonding occur. Such local de-bonding can then propagate either immediately, or during fatiguing in the course of repeated cycles of loading and unloading, or after long-period loading, leading to overall failure.

Characteristic of the load dumping situation just described is the relatively great elevation of load-transfer intensity values at the end point region of the rod above load-transfer intensity values at less-deep regions within the bore, including adjacent regions just slightly less deep than the end point region.

FIG. 2A illustrates in rudimentary form an embodiment of the invention whose features may be compared or contrasted with those of the hypothetical terminal system of FIG. 1. In the system of FIG. 2A, the diameter and material of the round pultruded rod is the same as in the FIG. 1 system, and the same is true of the shank diameter and material. Pultruded tension rods of round cross-section as referred to in this disclosure were obtained from Avia Sport Composites Inc., 71 3rd Street S.E., Hickory, N.C. 28602 (web address: aviasport.net) where they are available as "Graphlite®MicroCarbon Rod" in "Standard Modulus" or "Intermediate Modulus." The former were used in tests. Pultruded tension rods of round cross-section in ¼" size were also obtained from Strongwell Inc., 400 Commonwealth Ave., Bristol, Va. 24203 (web address: strongwell.com). Although shank material is preferably 6AL4V titanium, stainless steel alloys ASTM 304 or 316 may be used. Assume the latter is used as the shank material for both the systems of FIG. 1 and FIG. 2A.

The potting resin is also assumed to be the same for the systems of FIG. 1 and FIG. 2A, and for the most part the resin of the system of FIG. 2A is of the same wall thickness as in the FIG. 1 system. Potting resin 16a, and the potting resins of the other embodiments of the terminal system of the invention, are adhesive type bonding agents that chemically bond to the composite rod. A typical plastic adhesive such as epoxy, polyurethane, phenolic, silicone, or other type binder resin may be used. The binder system may also have filler introduced which may help in forming a thicker or more viscous binder, or aid in other properties of the binder such as thermal expansion, density, hardness, toughness, reduced bond line thickness, or some other desirable property of the system.

A suitable potting resin, obtained from Master Bond Inc., 154 Hobart Street, Hackensack, N.J. 07601 (web address: masterbond.com), is Master Bond Grade "Supreme 10HT" from their line of "One Component Epoxy Adhesives, Sealants, Coatings, Encapsulants, & Potting Compounds." This is a single part or premixed epoxy and will function at temperatures up to 400 degrees F. It is also a paste type epoxy, so is easy to inject and is not watery in its flow. A negative is that this product must be heat cured for 1 hour at 250 degrees F. or 45 minutes at 300 degrees F.

Potting resin and hardener used for some testing may be obtained from the line of "West System" epoxy products of Gougeon Bros. Inc., 100 Patterson Ave., P.O. Box 908, Bay City, Mich. 48707 (web address: gougeon.com), specifically their. "105 Epoxy Resin" and "205 Fast Hardener." While the resulting cured resin layer is suitable for test purposes, it is not suitable for manufacture because the product must be mixed in two parts and softens at 120–140 degrees F.

In the system of FIG. 2A, as in the imaginary construction of FIG. 1, the rod, in this case rod 10a, may be of round cross-section and is received in the bore 11a of the sleeve 12a, extending into the sleeve past the rod entry point 19a.

As in the imaginary construction of FIG. 1, the sleeve is formed as part of the shank, in this case 14a, of a terminal fitting, in this case again an eye. As before, the eye may have a threaded bore (not shown) in which exterior threading (not shown) on the shank is received, the eye being turned down tightly on the shank to form a fitting, in this case the eye. Or the shank and eye can be joined by other means, for example adhesive or welding. Or the shank and the eye can be integrally formed from a single piece of material. Or, the shank can join to or be integrally formed with parts other than an eye to provide other common or known types of fittings, such as forks, tees, studs, nailheads, and stemballs that interconnect with other elements to form eye/jaw toggles, jaw/jaw toggles, stud terminals, swivel bails, or other connecting or tie-down devices, or the shank can be somewhat elongated and threaded for a required adjusting distance to function as part of a turnbuckle connection, or the shank can form part of a fitting for still other kinds of connections and tie-downs, for example but without limitation, nail head, stemball, cylinder terminal, shroud terminal, t-ball terminal, shackle, wedge, and in general all those kinds of fittings which in present practice are swaged to or otherwise terminate metal rigging lines.

The same is true of the shanks of all herein disclosed embodiments of the terminal system of the present invention. Such kinds of fittings may be referred to as terminal fittings.

The rod 10a is bonded to the sleeve by the potting resin 16a, which is sandwiched between the rod and the sleeve and fills any parts of the bore not taken up by the rod. It is to be noted that the radial thickness (wall thickness) of the layer of resin is relatively uniform along a majority of the total length of the bore 11a as compared to the varying wall thickness of the sleeve 12a along the same length.

As described so far, the system of FIG. 2A is similar to the imaginary system of FIG. 1. However, in the system of FIG. 2A, the end portion 18a of the sleeve is continuously tapered from a relatively thin sleeve wall thickness at the entry point region of the rod to progressively greater wall thicknesses at regions deeper within the bore. While any tapering, as depth within the bore increases, is generally in the direction of increasing wall thickness of the wall of sleeve 12a, continuity of tapering may be interrupted at segments along the length of the bore, such as the central region 20a. Inwardly or still deeper within the bore beyond this central region, continuous tapering in the direction of increasing sleeve wall thickness resumes and extends down toward the inner end of the bore 11a.

At the same time, the end of the rod 10a is continuously tapered from a relatively small diameter at the end point region of the rod (or from a point or nib, if there is one at the rod end) to progressively greater diameters at regions less deep within the bore 11a. This flaring or outward continuous tapering extends to the central region 20a, and the rod diameter then may remain constant as the rod extends on toward the entry point 19a.

Again, as in the imaginary system of FIG. 1, the intended function of the system shown in FIG. 2A is for the tensile load carried by the rod to be transferred to and fully taken up by the shank, the load transfer occurring across the layer of potting resin and along the length of the bore in which the rod is received. However, when load is applied, the outcome will be significantly better than the outcome described for the imaginary system of FIG. 1. The reasons for this are believed to be as follows: In the system of FIG. 2A, as the applied load increases, the endmost, thinnest parts of sleeve end portion 18a do not stiffly resist elastic deformation, but rather, due to their small cross-sectional area, relatively readily begin to elastically deform or stretch and take up part of the applied load. As the load increases, the progressively thicker parts of the end portion 18a stretch and contribute to taking up the load, as do portions of the sleeve wall beyond the end portion 18a. It is believed that this load transfer process proceeds quickly and widely enough to prevent the local stress intensity at the entry point region from escalating beyond the load-transfer intensity capacity of the resin, thus avoiding the occurrence of any defects in local bonding, and thereby maintaining a sound terminal system.

It is believed that, by comparison with the imaginary system shown in FIG. 1, a characteristic of the system shown in FIG. 2A is that the sleeve tapering operates to establish a relatively low elevation of load-transfer intensity values at the entry point region above load-transfer intensity values at deeper regions within the bore, including adjacent regions just a little further in than the region of the entry point. In other words, the described tapering operates to decrease load dumping, that is, reduce such elevation of load transfer intensity values from what it would be if there were no tapering of the sleeve 12a.

Meanwhile, looking at the system from the standpoint of loads imposed on the rod 10a by the shank 14a under applied loads, again the system of FIG 2A compares favorably to the system of FIG. 1. It is believed that, in the system of FIG. 2A, as the applied load increases, the endmost, thinnest parts of the tapered part of the rod do not stiffly resist elastic deformation, but rather, due to their small cross-section, relatively readily begin to elastically deform or stretch and take up part of the load which transfers through the potting resin from the sleeve 12a to the rod. As the load increases more and more, the progressively thicker parts of the tapered portion of the rod 10a stretch and contribute to taking up the load, as do portions of the rod beyond its tapered portion. This load transfer process proceeds quickly and widely enough to prevent the local stress intensity at the end point region of the rod from escalating beyond the load-transfer intensity capacity of the resin, thus again avoiding the occurrence of any defects in local bonding, and thereby maintaining a sound terminal system.

It is believed that by comparison with the imaginary system shown in FIG. 1, another characteristic of the system shown in FIG. 2A is that the rod tapering operates to establish a relatively low elevation of load-transfer intensity values at the end point region above load-transfer intensity values at less-deep regions within the bore, including adjacent regions just a little less deep than the end point region itself. In other words, the described tapering operates to decrease load dumping, that is, again, reduce the elevation of load transfer intensity values from what it would be if there were no tapering of the rod.

The sleeve tapering in FIG. 2A is interior tapering, that is, the tapering is on the inside of the wall of sleeve 12a. The sleeve tapering in FIG. 2A is also all continuous or smooth tapering, as distinguished from stepped tapering. Starting from the region of the rod entry point 19a, all tapering is such that the sleeve is tapered from a relatively thin sleeve wall thickness at the entry point region to progressively greater wall thicknesses at regions deeper within the bore.

FIG. 2B illustrates a load transfer system embodying the invention but differing in several ways from the embodiment of FIG. 2A. In FIG. 2B, the sleeve 12b of the shank 14b is exteriorly tapered at the end portion 18b, that is, such tapering is on the outside of the wall of sleeve 12b. Such exterior tapering is continuous or smooth tapering as distinguished from stepped tapering. The sleeve 12b is also interiorly tapered, using stepped tapering only, across five "treads" and four "risers". Thus, unlike the system of FIG. 2A, the system of FIG. 2B uses both continuous and stepped tapering of the sleeve, and uses exterior tapering of the sleeve in addition to interior tapering.

However, the system of FIG. 2B is similar to the system of FIG. 2A in that, starting from the region of the rod entry point 19b, all tapering of the sleeve, whether interior or exterior, and whether continuous or stepped, is such that, overall, the sleeve is tapered from a relatively thin sleeve wall thickness at the entry point region to progressively greater wall thicknesses at regions deeper within the bore. Preferably, as shown in the drawings, this progression toward greater wall thickness at greater depth is not interrupted by the occurrence of "negative taper" anywhere along the extent of the bore, i.e. by the occurrence of any small increase in wall thickness with greater depth, although it is possible that, in some applications, one or more occasional small increases might be tolerated if sufficiently small in magnitude.

A further similarity is that in both systems, the rate of taper (change in sleeve cross-section per unit of bury length) is lower in the center part of the bury length than towards either end, as can be seen by inspection of the changes in sleeve wall thickness along the bury length in both FIGS. 2A and 2B. This reduction of rate of taper in the center part of the bury length is believed to improve uniformity (or, more precisely, is believed to further reduce non-uniformity) of load-transfer intensity values along the bury length of rod 10b.

Like the rod 10a of FIG. 2A, the rod 10b of the system of FIG. 2B may be round in cross-section.

FIG. 2C illustrates a terminal system similar to that of FIG. 2B in the general arrangement of the tapering. However the inside of the wall of the bore 11c is threaded, as indicated, so that the sleeve 12c and resin 16c are keyed together against relative longitudinal movement in addition to being bonded or adhered at their interface. Keying provides a mechanical interlock at the interface, contributing to transfer-load intensity capacity across the interface. This contribution may be important because, while potting resins are currently sold as effectively bonding to stainless steel, aluminum, and titanium, these bonds may not be trustworthy because, in the long run, the stainless may corrode, aluminum may form an oxide, and titanium is hard to bond without cleaning and acid-etching the surface. Additionally, the threads increase the area of the interface, and therefore the area of bonding, assuming there is bonding, and in that sense improve strength.

On the other hand, when threading is employed, thread stress rise is a concern. However this concern appears to be ameliorated if contact between the rod 10c and the threads is avoided, and preferably also is not closely approached.

For simplicity of illustration, the threading within the sleeve 12c of the shank 14c is shown as uniform along the bury length. In practice, it is preferable to reduce the thread size as the inside diameter of the bore 11c decreases along the bury length. Also, threads of different pitches can be used to mechanically lock the resin against backing out under torque loads that might be imposed by the rod 10c. Fine gradations of thread diameter can be obtained by using dies of both metric and English dimensions to cut the threads. In general, it is desirable to degrease the threads after cutting to promote better bonding at the resin/sleeve interface. Acid etching and pickling the sleeve metal may enhance the bond to the point where threads are unnecessary. However, there is always the risk that any contamination before bonding could compromise the bond.

It would be possible in theory to use continuously tapering taps where the threads decrease in diameter from the shank to the tip of the tap. However, use of standard taps reduces cost and has been found to work satisfactorily. If desired, after the threads are cut, a tapered ream can be used to soften the transition between successive bore sections formed by different tap sizes. Also, since standard tap threads come to a relatively sharp edge, running a drill slightly larger than the thread inside diameter will cut those edges away, reducing thread stress rise. While such refinements are available to smooth out the tapering of the sleeve and to enhance the resin/sleeve connection, they may often prove to be unnecessary in specific applications.

While keying of the potting resin and the sleeve is accomplished by threading in FIG. 2C, keying may be accomplished by other arrangements in which the sleeve and the potting resin protrude into each other in a radially inward or radially outward direction. For example, deep etching of the interior face of the sleeve wall prior to pouring of the unset resin, followed by pouring and setting of the resin, might be sufficient to form interfering rugae in the opposing faces of the sleeve and resin, and key them together in that manner. Or, to similar effect, annular grooves might be interiorly cut in the interior face of the sleeve wall prior to pouring of the unset resin.

The rod 10c in FIG. 2C may again be round in cross-section, similarly to the rods 10a and 10b of FIGS. 2A and 2B.

FIG. 2C-1 shows an alternate feature that may contribute to the performance of the terminal system. As illustrated, the layer of resin 16c is extended past the entry end by allowing the uncured resin to fill in a short distance along the length of the rod, as shown. As in the particular example shown, the fill 26c preferably extends radially at least to the full thickness of the thickest part of the resin 16c within the sleeve bore. The resin may optionally extend further than shown, for example to double the distance shown along the rod and radially to the full diameter of the sleeve end at the end point 19c. Filled-in cured resin is believed to add bond surface as the resin reaches out beyond the sleeve end.

In FIGS. 2A, 2B and 2C, rods 10a, 10b and 10c are tapered at their inner ends by continuous tapering, as illustrated. The continuous taper may be produced by grinding the end of the rod in a conical shape to bring it to a point. Alternately, the rod may be tapered in steps, or may be tapered partly continuously and partly in steps. In the systems shown in all three figures, the rod tapering extends along at least about a quarter of the length of the associated bore 11a, 11b, or 11c, and preferably, as shown, along about a third of the bore length. In some applications, rod tapering may extend more than a third of the length.

FIG. 2D is less diagrammatic than FIGS. 2A, 2B and 2C, and illustrates a terminal system to scale, giving a better idea of the geometric slimness achieved by the invention. The particular system shown is one for terminating a ¼-inch (6.35 mm) composite rod 10d. The shank 14d and shank sleeve 12d are 14 mm in diameter and are made from 6AL4V titanium bar stock. The exteriorly tapered end portion 18d of the sleeve extends ⅝" from the rod entry point 19d. The bore 11d is 6 inches long and, starting at the rod entry point 19d, is tapped with 12 mm, ⅜ inch (9.5 mm), 8 mm, 6 mm and 4 mm thread (Unified National Course standard) along 1, 3, 1, ½ and ½ inch lengths respectively. The rod is tapered along its last 2 inches to a fairly narrow point that, at its very extremity, may be more blunted than needle-like.

In the particular embodiment shown in FIG. 2D, the shank 14d is exteriorly threaded at its end to receive an eye such as that seen in FIG. 2A. Again, as before described in respect of other embodiments of the invention, the eye may have a threaded bore in which exterior threading on the shank (threading 24d) is received, the eye being turned down tightly on the shank to form a fitting. Of course, the shank can be joined to the eye in other ways, or form part of other types of fittings as previously indicated with respect to the shanks of all embodiments of the terminal system of the invention.

The shank 14d is also provided with a vent passage 22d, which may be 2 or 3 mm in diameter and allows air and excess potting resin to escape when the resin is poured. Or the passage 22d may function solely as a drill guide, and not depended on to perform a vent function, as may corresponding central holes in other embodiments of the invention. If venting is not to be performed, these central holes may be blind holes since air need not escape through them. To make the fitting shank of FIG. 2D, 14 mm bar stock is cut to length. The vent passage or drill guide 22d is drilled on center in a lathe. This hole is then used to guide the next bigger tap size drill for 4 mm thread, say a 3 mm drill. This process is repeated until all the interior taper steps are drilled. After drilling, a tapered ream may be used to smooth out the step drilling. Then the taps are used. The smallest threads are tapped first, after which the larger taps are used. The taps are tapered near their tip ends so the thread radial depth decreases at the interior end of each tap length.

The thin end of the fitting tapers to 13 mm, thus the metal thickness at the entry point 19d is only ½ mm between peaks of the threads and the 14 mm outside diameter of the bar stock from which the fitting shank is made. Since the internal threads are not high-strength metal-to-metal engagement threads, it is advisable to use drills slightly larger than recommended on standard tap guide charts for each size thread. This avoids tap breakage, and threads that are not perfectly sharp on the inside diameter may be smaller stress risers.

After the interior tapping is completed and the interior is degreased, the solid (not bored) end of the shank 14d is externally threaded, using a lathe thread cutting tool or using a die thread cutter. This forms the threads 24d on the shank end for attaching the shank to an eye or to another element of some other kind of fitting.

The shank is now ready for assembly with the tension rod 10d, whose end has meanwhile been ground to the taper shape described above. Again, similarly to the rods 10a, 10b and 10c, the rod 10d may be round in cross-section. To hold the rod in the axial center of the fitting, a 1¼" or 1½" diameter wood dowel several inches long is drilled down its center with a ¼" hole. Then the ¼" hole is followed for half its length down the dowel with a 14 mm drill. Then the ¼" tension rod is inserted into the dowel and through the dowel for several inches. The rod is then slipped into the shank sleeve and the dowel onto the sleeve end for the depth of the 14 mm drilled hole. The rod is then pushed into the sleeve until it is grounded on the innermost thread surface. Then the rod is backed out a given predetermined amount, say ½" while the dowel is held shouldered down on the sleeve end. This position now assures both that the tension rod is centered axially and that the rod does not contact the threads in the bore. The rod and dowel are then carefully removed with their relative positioning preserved. The bore 11d is then filled with potting resin and more resin is applied to the tension rod. The tension rod is carefully inserted into the bore while preserving the positions of the rod and dowel relative to each other, and until the dowel is again shouldered down on the fitting. The assembly is then heated in an oven to cure and post cure the catalyzed resin adhesive. The assembly is then turned around and a fitting system at the opposite end of the rod 10d is completed in similar fashion. The dowel can be suitably hollowed out to accommodate potting resin for forming a "filling-in" similar to the filling-in 26c shown in FIG. 2C-1.

After cure, the wood dowel remains bonded to the metal sleeve, but it is easily split off the sleeve with a sharp chisel.

As so far described, the invention treats of the bonding of the inside of the shank sleeve of the fitting to the outside of the composite tension rod across a bond line between the two. All load transfer occurs on the inner side of the shank sleeve, and in this sense may be referred to as "inside" load transfer. However, the invention also contemplates "outside" load transfer, that is, load transfer on the outer side of the shank sleeve.

FIG. 2E illustrates a terminal system that accomplishes both "inside" and "outside" load transfer. Here the rod 10e, bore 11e, shank sleeve 12e, shank 14e itself, layer of potting resin 16e, and the sleeve end portion 18e, function similarly to correspondingly named elements in the earlier embodiments. As in the earlier embodiments, the rod and shank sleeve are spaced from each other throughout the length of the bore, and the spacing is filled by the cured potting resin to form a resin layer between the rod and the inside wall of the sleeve. Once again, the resin layer and the rod are secured to each other against relative longitudinal movement, as are the resin layer and the shank sleeve.

In addition, a built-up rod sleeve 13e of composite fiber-reinforced material surrounds and is fixed to the rod proper 10e at a region spaced from the entry end of the bore 11e. The rod sleeve 13e extends from such region past the entry end of the bore 11e and over the distal end of the shank sleeve 12e (i.e. over the end portion 18e of the shank sleeve). From there, the rod sleeve 13e continues along the shank sleeve 12e on the outside thereof along all or a majority of the length of the shank sleeve. The rod sleeve is bonded to the shank sleeve by an outer layer of resin 16e between these two elements. As seen in the illustration, the rod sleeve 13e is tapered so that its wall thickness decreases to a minimum in the vicinity of the proximal end of the shank sleeve, thereby avoiding load dump in such vicinity where the bond line between the rod sleeve and the shank sleeve starts. Similarly, tapering of the shank sleeve down to a minimum at its end portion 18e avoids load dump at that vicinity where the bond line between the rod sleeve and the shank sleeve starts from the other direction.

A fill 26e of potting resin supports the rod sleeve 13e between the end portion of the shank sleeve and the region where the rod sleeve is bonded to the rod proper 10e, adds bonding surface to the system, and advantageously tends to eliminate bending stresses where the rod 10e enters the fitting.

The rod sleeve 13e may be constructed of small ribbons or "tows" of fiber filaments, available in various grades expressing quantity of fibers in a tow. Tows of grades 6k and 18k were used in making up the sleeve. The tows are applied with sizing or hair-spray type binder that is compatible with the potting resin, and the potting resin also acts as a binder for the tows. Resin is applied to the tows, the tows are dipped in a resin bath and excess resin is removed with a light squeeze of gloved fingers, fibers are smoothed down on the rod surface and on the outside of the shank sleeve around their entire annular extents. Heat-shrink wrap or tubing (preferably the former) is applied over the fibers and shank sleeve and is heated with a heat gun starting in the middle of the length and moving to each end to provide a milking action, thereby squeezing out excess resin at each end of the rod sleeve and to tension the fibers. The resin is allowed to cure and the heat-shrink tubing may then be removed, or may be allowed to remain in place (not shown in the drawings) in whole or in part. The taper of the rod sleeve down onto the rod may be ground (sandpapered) as may the taper of the rod sleeve onto the shank or shank sleeve in the vicinity of the proximal (leftward as viewed) end of the shank sleeve.

Preferably, application of the shrink wrap or shrink tube in this procedure is preceded by wrapping "peel ply" material on the fibers. Use of peel ply is well known in fabrication of articles from glass fiber panels. Application of this material helps to stabilize the applied tow/resin complex until it is cured. The peel ply contains a release layer of nylon or the like and may be easily be removed from the cured rod sleeve by peeling after removal of the shrink wrap or shrink tube. The exterior of the peel ply's release layer is typically embossed or roughened, desirably leaving behind an embossed finished exterior on the cured rod sleeve and eliminating or reducing the need to sandpaper the sleeve.

This "inside-outside" load transfer system embodies the concept of lowering the shear stress on the bond line by increasing the bond area by roughly a factor of two, or reducing the length of the fitting by approximately half, or some combination of each whereby both the bond area is increased to some degree and the fitting length is decreased to some degree. Note that in the system of FIG. 2E, not only does the diameter of the rod proper increase as the thickness of the shank sleeve wall decreases to thereby provide complementary dual tapering, but the thickness of the rod sleeve wall decreases as the thickness of the shank sleeve wall increases to augment the complementary dual tapering.

Although complementary dual tapering is very advantageous in minimizing or avoiding load dumping, it is to be noted that the increase in bond area though provision of an "inside-outside" load transfer system inherently tends to reduce maximum load intensities and the incidence of load dumping, and is advantageous in and of itself irrespective of tapering.

As noted before, the interior of the shank sleeve may be threaded in any of the embodiments, including that of FIG. 2E. Similarly, threading may be used on the exterior of the shank sleeve Assuming the presence of threading, an example of dimensions for a fitting similar to that of FIG. 2E would be a rod of 7 mm diameter inserted into a 15 mm fitting. The diameter at the entrance end (the distal end of the shank sleeve) is the rod diameter of 7 mm plus potting resin thickness of 2 mm (1 mm each side) plus thread diameter of 1 mm (10 mm tap run in 9 mm bore) plus shank sleeve metal thickness of 1 mm (½ mm metal wall each side), or a total diameter of 11 mm. The difference between this 11 mm diameter and the 7 mm rod diameter is 4 mm, or a 2 mm step on each side. This step is smoothed by the fill 26e. The 11 mm diameter exterior of the shank sleeve at its distal end is tapered outwardly over a 40 mm length to the full 15 mm diameter of the shank.

For the cross-sectional area of the rod sleeve at the entry end of the shank sleeve to be the same as the cross-sectional area of the rod proper at the entry end of the bore, the rod sleeve diameter at the entry end is about 13 mm, or a 1 mm wall thickness of the rod sleeve on each side at the entry end. This thickness may be tapered down toward a minimum in the region of the proximal end of the shank sleeve, as shown in FIG. 2E.

Internal threads and threaded steps in the fitting are as follows: Over 135 mm of rod insertion, the first 90 mm is 10 mm threads, then a step down to 8 mm threads for 20 mm, then 6 mm for 15 mm, and 4 mm for 10 mm. An unthreaded 3 mm vent or guide hole (not shown) may also be added for say an additional 5 mm length beyond the 135 mm rod insertion length.

External threading is as follows: A 15 mm die is used that cuts only down to a ½ mm depth or to a 14 mm inside diameter. Due to the wall taper, the thread grooves in the exterior of the shank sleeve occur starting at some distance from the bore entrance.

With thread cut both internally and externally the solid metal left (14 mm outside diameter, 12 mm inside diameter) has more than twice the area of the rod, whose outside diameter is 7 mm.

FIGS. 2F-1 and 2F-2 show another terminal system that also accomplishes both "inside" and "outside" load transfer. In this system, again, the rod proper 10f, bore 11f, shank sleeve 12f, and the potting resin 16f between the rod and the inside of the sleeve shank all function similarly to correspondingly named elements in the earlier embodiments. A rod sleeve 13f is also provided, joined at its lower end to the rod proper 10f and extending up over the end portion 18f of the shank sleeve, similarly to the way the rod sleeve 13e in the earlier "inside-outside" embodiment is configured. However, as the rod sleeve 13f continues to extend along the shank sleeve 12f, the rod sleeve divides into two halves with each half gathered into one of a pair of bands 15f of the composite fiber material extending along radially opposite sides of the shank sleeve 12f and to a loop-engaging, convex, fiber-turnaround face 17f. As can be seen from the drawings, the face 17f is located beyond, in the proximal direction (i.e., leftward of as seen in the drawings), the proximal end of the shank sleeve and extends transversely from one side to the other of the fitting. As the drawings show, in this embodiment the fitting is an eye fitting, and the face 17f is formed as part of the edge of an auxiliary opening through the blade of the eye. The face 17f constitutes a convex edge on one side of this auxiliary opening, as seen in FIG. 2F-1.

Each of the bands 15f joins the other at the face 17f, and together the bands form a loop passing around the face, with the loop and face in contacting, load-transmitting relationship with each other. In this construction, a significant share of any tensile load imposed on the terminal system is carried by the bands 15f outside the shank sleeve 12f, with attribution of little or no shear stresses to that share of the load. Transmitting the remaining share of the load may still depend on the transfer of shear stresses across bond lines as in previous embodiments. In particular, transfer of shear stresses across the internal bond line corresponding to the inner layer of the potting resin 16f is preferably still relied on. In contrast, the outer layer of potting resin 16f may be wholly or partially eliminated, the loop formed by the bands 15f being primarily or completely relied on for load transmission that occurs via paths along the outer side of the shank sleeve 12f. However, an outer layer of potting resin may be provided incident to construction of the rod sleeve as described below and may be associated with some greater or lesser degree of transfer of shear stresses across the bond line formed thereby.

While it is presently preferred that the rod sleeve surround the rod at the location where it is attached to the rod, the invention does not exclude the rod sleeve being separated into two bands even at this location, so that the rod sleeve never divides into two bands or halves along the length of the fitting as described above, but rather the rod sleeve consists of a pair of bands separately extending all the way from their respective points of attachment on opposed sides of the rod proper to an associated fiber-turnaround face (for example a face such as the face 17f) at which they join each other to form the continuous loop around the face.

In constructions in which transfer of shear stresses across a bond line or lines is an important factor, tapering may continue to perform a function in minimizing or avoiding load dumping, but such minimizing or avoidance is greatly assisted by the load-transmitting relationship between the face 17f and the loop formed by the bands 15f. It is to be noted however, that the construction shown in FIGS. 2F-1 and 2F-2 and just described is another example of where, although tapering is very advantageous in minimizing or avoiding load dumping, provision of an "inside-outside" load transfer system inherently tends to reduce maximum load intensities and the incidence of load dumping, and is advantageous in and of itself irrespective of tapering.

The construction of the rod sleeve was accomplished by applying resin to a combination of grade 6k and grade 18k tows to make up a length of composite material, dipping the tows in a resin bath and pulling off excess resin with light squeezing with gloved fingers, dropping the center of the length of material past the loop-engaging face 17f and transversely halfway through the fitting, smoothing the fibers down onto the surface of the rod proper 10f, placing heat-shrink wrap around the fiber/resin complex starting near the loop-engaging face and extending lengthwise down to and across the joint between the nascent rod sleeve and the rod proper, shrinking the heat-shrink wrap with a heat gun from the end nearest the face 17f and toward and across the joining of the rod sleeve to the rod to thereby provide a milking action to tension the fibers and squeeze out excess resin from the end of the nascent rod sleeve, allowing the rod sleeve to cure, removing the heat shrink tube or allowing it to remain in place (not shown in the drawings) in whole or in part, and grinding (sandpapering) the final taper of the fibers down on the rod proper 10f. Before dropping the length of material past the face, it is preferable to pre-apply potting resin to drilled or ground surfaces at the face location and cure the pre-applied resin to eliminate sharp metal edges that might cut fibers.

Again, as in a previously described procedure, it is preferred that application of the shrink wrap in this procedure be preceded by wrapping of peel ply material on the fibers, and removal of the shrink wrap be followed by removal of the peel ply.

FIGS. 2G-1 and 2G-2 show a system similar to that of FIGS. 2F-1 and 2F-2 except that the fitting of the FIGS. 2G-1 and 2G-2 is a two-bladed or "jaw" fitting rather than the single bladed eye fitting of the earlier figures. The loop-engaging, convex, load-transmitting face 17g of this embodiment is in the form of a curved nose formed on the end of the shank 14g, the blades of the jaw being machined, welded, cast, or forged to the shank in this particular construction. The bands 15g together form a loop passing around the face 17g. Like the face 17f, the face 17g is located on the associated fitting beyond, in the proximal direction, the proximal end of the associated shank sleeve.

FIGS. 2H-1 and 2H-2 show another similar system. Here the fitting is a tee-style fitting, and the loop-engaging, load-transmitting face 17h is simply the wall of the cross-pin of the fitting, midway along the cross-pin's length, or a slight groove formed in the cross-pin's wall at that location. Typically the diameter of the cross-pin is 1.5 to 2.5 times the diameter of the pultruded rod proper. Again, like the faces 17f and 17g, the face 17h is located on the associated fitting beyond, in the proximal direction, the proximal end of the associated shank sleeve.

In the fittings that incorporate a loop-engaging, convex, fiber-turnaround face extending transversely from one side to the other of the fitting, such loop may be provided by making or modifying a transverse opening for this purpose as in the FIGS. 2F-1 and 2F-2 embodiment, or by utilizing or modifying a known type of transverse surface for this purpose as in the FIGS. 2G-1 and 2G-2 embodiment, and also as in the FIGS. 2H-1 and 2H-2 embodiment (and also as in an non-illustrated embodiment that would result from somewhat increasing the thickness of the eye-plate of the embodiment FIGS. 2F-1 and 2F-2, grooving the rim of the eye-plate, and looping the bands 15g around the grooved rim of the eye-plate, using such grooved rim, in place of the face 17f, as the loop-engaging, convex, fiber-turnaround face.) In all these examples, the loop-engaging, convex, fiber-turnaround face is located on the fitting beyond, in the proximal direction (i.e., leftward of, as seen in the drawings), the proximal end of the shank sleeve.

In embodiments of the invention described above, the entry cross-section of the composite tension rod proper, that is, the cross-sectional area of the tension rod at the rod entry points, such as points 19a, 19b, 19c, and 19d, generally remains constant for part of the bury length before it begins to taper down. However, in some circumstances it may be desirable to taper the rod as it reaches the rod entry point. An instance of slight reduction of the cross-section of the rod proper at the entry point is illustrated in FIG. 2J, which shows a terminal system similar to those already described but used in association with a pultruded composite fiber-reinforced tension rod 10j that is hexagonal in cross-section, rather than round. In the illustration, similar terminal systems are associated with each end of the tension rod.

In the terminal system embodiment shown in FIG. 2J, a sleeve 12j receives the rod 10j of hexagonal cross-section. Following its forming by pultrusion, and prior to its insertion in the sleeve, the rod is ground to form a conical tapering surface 28j extending from rod entry point 19j to a transition location which is labeled 29j in FIG. 2J. The conical tapering surface has six segments, two of which can be seen in FIG. 2J. As shown, the portion of the conical surface that is in each segment extends from a point even with entry point 19j to the full width of the segment at transition location 29j. While in the drawings an intersection line is shown at transition location 29j, it will be understood that preferably the line of intersection at this point is not formed at a sharp or abrupt intersection, but rather as a faired, smooth transition. As can be seen in FIG. 2J, such tapering of hexagonal rod is fits well with the general configuration in the region between the rod entry point 19j and the transition location 29k. The transition location 29j can be deeper within the sleeve bore than shown, for example it could be at twice the depth shown in FIG. 2J.

At points deeper into the sleeve bore than the transition point 29j, the now-round rod may have the same configuration, or a closely similar configuration, as the rods in the system of, for example, FIG. 2C, including a conical taper ground at the end of the rod, and extending over about ⅓ the buried length of the rod.

While the cross-section area of the rod decreases somewhat between the locations 19j and 29j, thereby theoretically reducing the strength of the rod from that one standpoint, it is to be noted that the fitting sleeve and potting resin protect the entire buried length of the rod against chafing, abrasion, impact, and ultraviolet, so the theoretical loss of strength between the locations is counterbalanced in a sense by such protective effect. Also, load transfer begins to relieve the rod of some tensile force as it extends into the sleeve bore.

The invention does not exclude the extending of the hexagonal rod into the bore of the sleeve and down to the point where tapering of the point as a conical surface begins, or down to a tapered point consisting of a six-sided pyramid whose point is the endpoint of the rod, or down to a truncated or relatively blunt-pointed pyramid, nor does it exclude other similar configurations.

In the embodiments of the invention described above, the entry cross-section of the composite tension rod, that is, the cross-sectional area of the tension rod at rod entry points, such as points 19a, 19b, 19c, 19d, and 19e, has been the same as the cross-section of the rod proper along all or most of its free length, so that the full entry-end cross-section is the same as the cross-section along most of the free length. However, the invention is not limited to this relationship. In particular, in some circumstances it may be necessary or desirable to build up the cross-sectional area of the rod proper at the rod entry point or shortly before the rod reaches its entry point, so that the full entry-end cross-section of the rod is greater than the cross-section along all or most of the free length of the rod rather than being equal thereto.

An instance of such building up of the cross-sectional area of the rod proper at the fitting to provide an entry-end cross-section greater than the cross-section along most of the free length is shown in FIGS. 2K-1 to 2K-3. FIGS. 2K-I illustrates in cross section a rod 10k made up of two parallel sub-rods glued together along their line of contact by potting resin 16k. This represents the cross-section of the rod along its free length. For example, two ⅛ inch rods are joined to form a rod of ¼ by ⅛ inches in cross section. The ends of the rod are then built up in cross-section by gluing in additional rods and filler as seen in FIG. 2K-2, and then sanding the built up end to produce rod ends of circular or almost circular cross section, as seen in FIG. 2K-3. Such built-up rod ends are approximately equal in length to the bore length of the shank sleeve of each associated end fitting, or to such length plus an additional length increment. When the terminal system includes a rod sleeve, such additional length increment is preferably sufficient to provide the built-up rod cross-section where the rod sleeve is joined to the rod.

The built-up rod ends are further shaped by sanding to suitably taper within the shank sleeve bore of the associated fittings in a manner similar to that described above in connection with already described embodiments. In sailboat rigging applications, the 2:1 aspect ratio of such rod along its free length as compared to 1:1 aspect ratio of circular rod of equal tensile strength provides improved windage characteristics.

Another instance of building up of the cross-section of the rod proper so that the full entry-end cross-section exceeds the cross-section of the rod proper along most of its free length may be when pultruded composite fiber-reinforced tension rod is used that is polygonal in cross-section, rather than round, as in the case of the rod 10m illustrated in FIG. 2M-1. This illustrates a use of hexagonal composite rod that is an alternative to the manner of use of hexagonal composite rod described above and shown in FIGS. 2J and 2J-1. The hexagonal cross-section of the rod may be built up to a circular cross section at its ends when it is to utilize one of the terminal systems taught in the present invention, so as to more closely conform to the shape of the bore of the shank sleeve, or optionally may not be built up. The ends may be built up simply by using tows dipped in a resin bath and then applied to the sides of the rod as fill 26m and heated to cure. The built-up rod ends then may be ground (sandpapered) to circular shape, as seen in FIG. 2M-2. This built-up portion of the rod may begin where the rod first enters an associated terminal fitting, or just before such entry, and may extend some distance within the fitting to the point where tapering of the rod begins.

Hexagonal composite fiber-reinforced tension rod is not known to be available from any commercial source, or any other source. Instead, it may be pultruded using a hexagonal die opening.

While for simplicity of illustration, some of the embodiments described above have been shown without threading such as shown in FIGS. 2C and 2D, in general it is preferable to include such threading in terminal systems made according to the present invention.

Although terminal systems of the invention have been disclosed which do not include any indentations or keying between the composite tension rod and the potting resin, if composite rod is developed that can provide such keying, a system embodying such keying is not intended to be excluded from applicant's claims.

As used herein, "bore" includes a tapered hole.

As used herein, "rod" includes cable made up of two or more parallel composite tension rods glued together along their common length.

While the fitting shanks referred to in this disclosure are disclosed as being made of metals, it is not intended to exclude fiber-reinforced composite material as appropriate to use for shanks of fittings alone, or for shanks along with other parts of the fitting as well. At the present time, appropriate material has not been identified.

It is to be understood in the following claims that the interior bore of a shank sleeve, such as the bore $11d$ of the shank sleeve $12d$, does not include any vent or guide hole that may happen to accompany the bore, such as the vent or guide hole $22d$ that accompanies the bore $11d$, nor does the proximate end of the shank sleeve include any such vent or guide hole.

Terminals made according to the invention are envisioned using rods of up to three inches in diameter, shank sleeves of say 75 inches in length and shank stock of 5 or 6 inches in diameter, depending on strength of the materials. In general, if step tapering is used, the number of steps will increase as the sizes of the terminals increase.

The invention is not intended to be limited to details of the above disclosure, which are given by way of example and not by way of limitation. Many refinements, changes and additions to the invention are possible without departing from the scope of the following claims as properly interpreted.

What is claimed is:

1. A slim-geometry high-strength terminal system for transferring tensile loads carried by a composite tension rod from an end of the rod to a terminal fitting that includes an annular shank with a sleeve portion at its distal end, or from said fitting to said rod, said shank sleeve having an interior bore, one end of said composite tension rod extending into the entry end of the bore and along the bore and ending at or near the inner end of the bore, the wall of the shank sleeve being tapered, continuously or in steps, from a small wall thickness and cross-sectional area at the entry end of the bore to increasing wall thicknesses and cross-sectional areas at increasing depths within the bore, said rod being tapered, continuously or in steps, from minimum cross-section at its end to its full entry-end cross-section at a given distance from said end, said rod and said shank sleeve being spaced from each other throughout the length of said bore, said spacing being filled by a cured potting resin to form a resin layer between said rod and said wall of said sleeve, said resin layer and said rod being secured to each other against relative longitudinal movement, said resin and said shank sleeve also being secured to each other against relative longitudinal movement.

2. A terminal system as in claim 1, said rod and said shank sleeve having complementary dual tapering along said given distance such that as the cross-section of the rod along said distance increases, wall thickness and cross-sectional area of the shank sleeve decreases.

3. A terminal system as in claim 1, the radial thickness of said resin layer being relatively uniform along all or a majority of the total length of the bore as compared to the varying wall thickness of said sleeve along the same length.

4. A terminal system as in claim 1, said tapering of said wall of said shank sleeve comprising, in whole or in major part, internal tapering.

5. A terminal system as in claim 1, said tapering of said wall of said shank sleeve comprising both internal and external tapering, with said internal tapering comprising the major part of said tapering of said wall.

6. A terminal system as in claim 1, said given distance being at least about a quarter the length of the bore.

7. A terminal system as in claim 1, said given distance being at least about a third the length of the bore.

8. A terminal system as in claim 1, said rod and said resin layer being chemically bonded together and said shank sleeve and said resin layer being keyed to each other against relative longitudinal movement.

9. A terminal system as in claim 1, said rod and said resin layer being chemically bonded together, and said shank sleeve and said resin layer being both chemically bonded together and keyed to each other against relative longitudinal movement.

10. A terminal system as in claim 1 said rod and said resin layer being chemically bonded together and said shank sleeve and said resin layer being keyed to each other against relative longitudinal movement, said keying being by engagement of threading formed on the inside of said wall of said shank sleeve and on the outside of said resin layer by threading of the inside of said wall and setting of the resin against the threaded surface.

11. A terminal system as in claim 1 said shank sleeve and said resin layer being keyed to each other against relative longitudinal movement, said keying being by engagement of interpenetrating depressions and elevations formed on the inside of said wall of said shank sleeve and on the outside of said resin layer by etching of the inside of said wall and setting of the resin against the etched surface.

12. A slim-geometry high-strength terminal system for transferring tensile loads carried by a composite tension rod from an end of the rod to a terminal fitting that includes an annular shank with a sleeve portion at its distal end, said shank sleeve having an interior bore, one end of said composite tension rod extending into the entry end of the bore and along the bore and ending at or near the inner end of the bore, a rod sleeve fixed to the rod at a region short of said entry end, the rod sleeve extending from that region past said entry end of the bore and over the distal end of the shank sleeve and on the outside thereof along all or a majority of the length of the shank sleeve, said rod and said shank sleeve being spaced from each other throughout the length of said bore, said spacing being filled by a cured potting resin to form a resin layer between said rod and said shank sleeve.

13. A terminal system as in claim 12, said resin layer and said rod being secured to each other against relative longitudinal movement, said resin layer and said shank sleeve also being secured to each other against relative longitudinal movement.

14. A terminal system as in claim 12, said rod sleeve being bonded to said shank sleeve with potting resin and tapered so that said rod sleeve's wall thickness decreases to a minimum in the vicinity of the proximal end of the shank sleeve.

15. In a terminal system as in claim 12, a loop-engaging, convex, fiber-turnaround face located on the fitting, said face extending transversely from one side to the other of said fitting, the rod sleeve extending to said face from where the rod sleeve is fixed to the rod, the rod sleeve, as it so extends, constituting two divided halves, or dividing into two halves, with each half gathered into one of a pair of bands of composite material, the members of the pair of bands extending lengthwise on and along opposite sides of the shank sleeve and to said face, each member of the pair of bands joining the other member of the pair at said face, said pair of bands together forming a loop passing around said face, said loop and face being in load-transmitting relationship with each other.

16. A terminal system as in claim 15, said face being located on the fitting beyond, in the proximal direction, the proximal end of the shank sleeve.

17. A terminal system as in claim 12, the wall of the shank sleeve being tapered, continuously or in steps, from a small wall thickness at the entry end of the bore to increasing wall thicknesses at increasing depths within the bore, said rod being tapered, continuously or in steps, from minimum diameter at its end to a greater diameter at a given distance from said end.

18. A terminal system as in claim 17, the rod sleeve being bonded to the shank sleeve with potting resin and tapered so that said rod sleeve's wall thickness decreases to a minimum in the vicinity of the proximal end of the shank sleeve.

19. A terminal system as in claim 17, a loop-engaging, convex, fiber-turnaround face located on the fitting, said face extending transversely from one side to the other of said fitting, the rod sleeve extending to said face from where the rod sleeve is fixed to the rod, the rod sleeve, as it so extends, constituting two divided halves, or dividing into two halves, with each half gathered into one of a pair of bands of composite material, the members of the pair of bands extending lengthwise on and along opposite sides of the shank sleeve and to said face, each member of the pair of bands joining the other member of the pair at said face, said pair of bands together forming a loop passing around said face, said loop and face being in load-transmitting relationship with each other.

20. A terminal system as in claim 19, said face being located on the fitting beyond, in the proximal direction, the proximal end of the shank sleeve.

21. A terminal system as in claim 17, said rod and said shank sleeve having complementary dual tapering along said given distance such that as diameter of the rod along said distance increases, wall thickness of the shank sleeve decreases.

22. A terminal system as in claim 18, said rod and said shank sleeve having complementary dual tapering along said given distance such that as diameter of the rod along said distance increases, wall thickness of the shank sleeve decreases.

23. A terminal system as in claim 19, said rod and said shank sleeve having complementary dual tapering along said given distance such that as diameter of the rod along said distance increases, wall thickness of the shank sleeve decreases.

24. A terminal system as in claim 21, said given distance being at least about a quarter the length of the bore.

25. A terminal system as in claim 21, said given distance being at least about a third the length of the bore.

26. A terminal system as in claim 22, said given distance being at least about a quarter the length of the bore.

27. A terminal system as in claim 22, said given distance being at least about a third the length of the bore.

28. A terminal system as in claim 23, said given distance being at least about a quarter the length of the bore.

29. A terminal system as in claim 23, said given distance being at least about a third the length of the bore.

30. A terminal system as in claim 20, said rod and said shank sleeve having complementary dual tapering along said given distance such that as diameter of the rod along said distance increases, wall thickness of the shank sleeve decreases.

31. A terminal system as in claim 12, a fill of potting resin underlying and supporting the rod sleeve between the distal end of the shank sleeve and said above-recited region at which the rod sleeve is bonded to the rod.

32. In a terminal system as in claim 12, a loop-engaging, convex, fiber-turnaround face located on the terminal fitting, said face extending transversely from one side to the other of said fitting, the rod sleeve extending to said face from where the rod sleeve is bonded to the rod, the rod sleeve, as it so extends, dividing into or comprising longitudinally extending bands of composite material with a first band extending along the shank sleeve at a first circumferential region around the circumference of the shank sleeve and a second, paired band extending along the shank sleeve at an opposing, second circumferential region around the circumference of the shank sleeve, said first and second bands of composite material joining each other at said face, said first and second bands together forming a loop passing around said face, said loop and face being in load-transmitting relationship with each other.

* * * * *